(12) United States Patent
Tao et al.

(10) Patent No.: US 8,643,849 B2
(45) Date of Patent: Feb. 4, 2014

(54) MEASUREMENT SYSTEMS AND METHODS

(75) Inventors: Li Tao, Shanghai (CN); Guiju Song, Shanghai (CN); Xinjun Wan, Shanghai (CN); Kevin George Harding, Niskayuna, NY (US); Steven Robert Hayashi, Niskayuna, NY (US); James Joseph Hoffman, Cincinnati, OH (US); Charles Walter Muekmore, Clarksville, OH (US); Yana Zhang Williams, Schenectady, NY (US); Shukuan Xu, Shanghai (CN)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 13/312,423

(22) Filed: Dec. 6, 2011

(65) Prior Publication Data

US 2012/0147383 A1 Jun. 14, 2012

(30) Foreign Application Priority Data

Dec. 10, 2010 (CN) .......................... 2010 1 0601226

(51) Int. Cl.
*G02B 11/24* (2006.01)

(52) U.S. Cl.
USPC ............................ 356/601; 356/608; 356/5.01

(58) Field of Classification Search
USPC ...................... 356/600–636, 5.01, 5.11, 5.15; 250/559.22, 559.23, 559.24, 237 G
See application file for complete search history.

(56) References Cited

U.S. PATENT DOCUMENTS

| | | | |
|---|---|---|---|
| 3,762,104 A | | 10/1973 | Fluckiger |
| 4,913,547 A | * | 4/1990 | Moran .......................... 356/489 |
| 4,957,362 A | * | 9/1990 | Peterson ...................... 356/5.14 |
| 5,371,588 A | * | 12/1994 | Davis et al. ................... 356/489 |
| 5,579,103 A | * | 11/1996 | Tachikawa ..................... 356/5.1 |
| 5,682,236 A | * | 10/1997 | Trolinger et al. ............. 356/484 |
| 5,796,511 A | * | 8/1998 | Allen et al. ................... 359/305 |
| 6,075,605 A | * | 6/2000 | Futamura et al. ............. 356/608 |

(Continued)

FOREIGN PATENT DOCUMENTS

| | | |
|---|---|---|
| DE | 102008050637 A1 | 4/2010 |
| EP | 1103786 A2 | 5/2001 |
| GB | 2470470 A | 11/2010 |

OTHER PUBLICATIONS

Sheng-Hua Lu and Cheng-Chung Lee. Meas. Sci. Technol. 13 (2002), pp. 1382-1387. Title: "Measuring large step heights by variable synthetic wavelength interferometry".

(Continued)

*Primary Examiner* — Sang Nguyen
(74) *Attorney, Agent, or Firm* — Peter T. DiMauro; Global Patent Operation

(57) ABSTRACT

A measurement system comprising a light source unit, a projection unit and an optics unit is disclosed. The light source unit is configured to generate a plurality of modulated phase shifted light beams. The projection unit is configured to reflect the modulated phase shifted light beams onto an object surface. The optics unit is configured to capture the modulated phase shifted light beams from the object surface. The measurement system further comprises a photodetector and a processor. The photodetector is configured to receive the modulated phase shifted light beams from the optics unit to generate electrical signals. The processor is configured to retrieve position information of the object surface based on the electrical signals from the photodetector. A measurement method is also presented.

18 Claims, 7 Drawing Sheets

(56) References Cited

U.S. PATENT DOCUMENTS

| | | | |
|---|---|---|---|
| 6,611,617 | B1 | 8/2003 | Crampton |
| 6,847,462 | B1 | 1/2005 | Kacyra et al. |
| 7,023,531 | B2 * | 4/2006 | Gogolla et al. .............. 356/5.01 |
| 7,215,413 | B2 | 5/2007 | Soreide |
| 7,242,484 | B2 | 7/2007 | Shirley |
| 7,286,243 | B2 | 10/2007 | Rosencwaig |
| 7,483,151 | B2 | 1/2009 | Zganec |
| 7,652,275 | B2 | 1/2010 | Gladnick |
| 2010/0092040 | A1 | 4/2010 | Fischer |
| 2010/0128259 | A1 | 5/2010 | Bridges et al. |
| 2011/0228251 | A1 * | 9/2011 | Yee et al. ..................... 356/5.01 |

OTHER PUBLICATIONS

Peter de Groot and John McGarvey. "Laser gage using chirped synthetic wavelength interferometry"; Proc. SPIE, 1821, 110 (1993); doi:10.1117/12.145530.

Killian, E.W. et al: "PCGAP: Users Guide and Algorithm Description", Sep. 1, 2000, XP055052656, Bechtel BWXT Idaho, retrieved from the Internet: URL: http://www.inl.gov/technicalpublications/Documents/3318133.pdf.

EP Office Action dated Feb. 19, 2013 from corresponding EP Application No. 11192790.1.

* cited by examiner dimensions. For example, some existing coordinate measurement machines (CMM) are employed to measure dimensions of an object. However, the measurement of such an object on the coordinate measurement machines is typically performed offline. In order to measure sizes of the object, machining processes of the object need to be paused so that the object is assembled onto the coordinate measurement machines to perform the measurement.
MEASUREMENT SYSTEMS AND METHODS

BACKGROUND OF THE INVENTION

1. Field of the Invention

Embodiments of the invention generally relate to measurement systems and methods. More particularly, embodiments of the invention relate to measurement systems and methods employing phase shifting analysis for dimension measurement.

1. Description of Related Art

Dimension measurement of an object is desirable to ensure that such an object is appropriately configured or shaped to achieve suitable properties, such as suitable tolerances to fit with other components properly.

There have been attempts to measure an object to determine if the object is properly machined to have desirable dimensions. For example, some existing coordinate measurement machines (CMM) are employed to measure dimensions of an object. However, the measurement of such an object on the coordinate measurement machines is typically performed offline. In order to measure sizes of the object, machining processes of the object need to be paused so that the object is assembled onto the coordinate measurement machines to perform the measurement.

After measurement, the machining processes of the object may be restarted based on measurement results. However, for a precision object, it is not practical to remove the object from a machine tool and then remount the object on the machine tool due to the errors associated with realigning the object on the machine tool. Generally, such measurement may be performed several times to machine the object with desirable dimensions, which results in a lower productivity, lower quality due to remounting of the object and is time consuming.

In some current applications, touch probes are employed to measure dimensions of an object. The touch probe does not measure the object directly, but rather uses the scales on the machine tool itself to make the measurement, with the touch probe providing a trigger used to take the measurement. The object can be left on the machine by using an on-machine touch probe so there is no loss in quality due to re-mounting of the object. Although such measurement increases the productivity since the object needs not to be detached from a machining device for measurement by the touch probes, it may be still time consuming due to a relatively long motion time of the touch probes on the object.

Therefore, there is a need for new and improved measurement systems and methods for measurement of dimensions of an object.

BRIEF SUMMARY OF THE INVENTION

A measurement system is provided in accordance with one embodiment of the invention. The measurement system comprises a light source unit, a projection unit and an optics unit. The light source unit is configured to generate a plurality of modulated phase shifted light beams. The projection unit is configured to reflect the modulated phase shifted light beams onto an object surface. The optics unit is configured to capture the modulated phase shifted light beams from the object surface. The measurement system further comprises a photodetector and a processor. The photodetector is configured to receive the modulated phase shifted light beams from the optics unit to generate electrical signals. The processor is configured to retrieve position information of the object surface based on the electrical signals from the photodetector.

A measurement method is provided in accordance with another embodiment of the invention. The measurement method comprises reflecting a plurality of modulated phase shifted light beams from a light source unit onto an object surface, capturing the modulated phase shifted light beams from the object surface via an optics unit, detecting the modulated phase shifted light beams from the optics unit to generate electrical signals via a photodetector and processing the electrical signals from the photodetector via a processor.

These and other advantages and features will be more understood from the following detailed description of preferred embodiments of the invention that is provided in connection with the accompanying drawings.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION OF THE INVENTION

Preferred embodiments of the present disclosure will be described hereinbelow with reference to the accompanying drawings. In the following description, well-known functions or constructions are not described in detail to avoid obscuring the disclosure in unnecessary detail.

Figure 1:
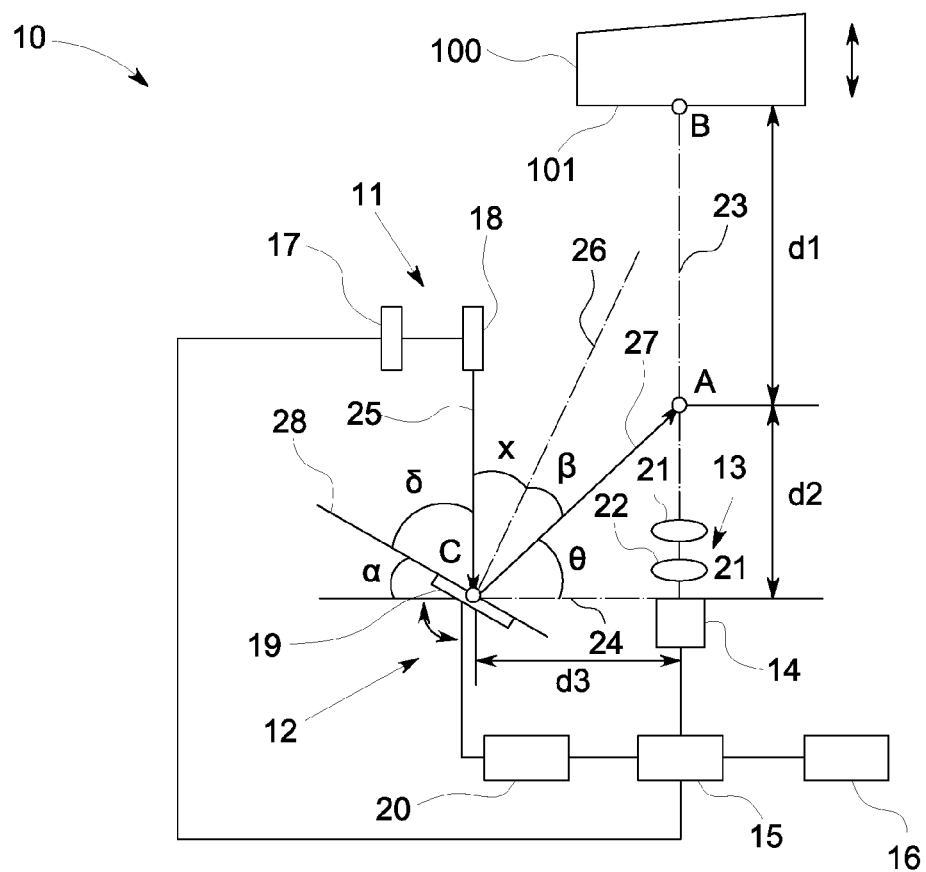
FIG. 1 is a schematic diagram of a measurement system for dimension measurement of an object in accordance with one embodiment of the invention.

FIG. 1 illustrates a schematic diagram of a measurement system 10 for dimension measurement of an object 100 in accordance with one embodiment of the invention. In non-limiting examples, the dimension measurement of the object 10 may comprise measurements of position such as depths (heights) or Z coordinate of a point on the object 100 along a Z-axis. Although an surface 101 of the object 100 is shown as being planar, embodiments of the invention is not limited to any specific type of the object surface, and the object may be any shape based on different applications.

As illustrated in FIG. 1, the measurement system 10 comprises a light source unit 11, a projection unit 12, an optics unit 13, a photodetector 14, a processor 15, and a monitor 16. For some arrangements, the light source unit 11 is configured to generate modulated light beams. In some examples, the light source unit 11 is configured to generate a plurality of modulated phase shifted light beams one by one over a short time. The projection unit 12 is configured to reflect the modulated light beams onto the desired points (areas) on the object surface 101 and the reflected light beams are diffused by the object surface 101.

The optics unit 13 captures and transmits the diffused light beams from the desired points on the object surface 101 to the photodetector 14. The photodetector 14 receives the diffused light beams from the optics unit 13 and outputs electrical signals correlated to intensities of the respective diffused light beams to the processor 15 for processing to retrieve the position information, such as depths or Z coordinates of the desired points on the object surface 101 along a Z-axis 23.

In some embodiments, the processor 15 is not limited to any particular processor for performing the processing tasks of the embodiment. The term "processor", as that term is used herein, is intended to denote any machine capable of performing the calculations, or computations, necessary to perform the tasks of the embodiment. The term "processor" is intended to denote any machine that is capable of accepting a structured input and of processing the input in accordance with prescribed rules to produce an output, as will be understood by those skilled in the art.

The monitor 16 is connected to the processor 15 and may comprise a display, such as a liquid crystal display (LCD), to display measured information about desired points on the object surface for users to observe. In some applications, the photodetector 14 may comprise a photodiode or any other suitable photosensitive devices that can convert light intensity into electric signals.

For the illustrated arrangement in FIG. 1, the light source unit 11 comprises a modulator 17 and a light source 18. The projection unit 12 comprises a rotatable element 19 and a controller 20. The optics unit 13 comprises a first optics 21 and a second optics 22. The modulator 17 communicates with the processor 15 to receive programmed instructions from the processor 15 so as to modulate the light source 18 to produce the modulated light beams. In one example, the light source 18 typically comprises a laser source, but may include any appropriate light source, such as a LED based light source.

The rotatable element 19 is configured to reflect the modulated light beams onto the desired points on the object surface 101. As used herein, the term "rotatable element" indicates the element can rotate, so that, in some non-limiting applications, the rotatable element may rotatably reflect a light beam (that is, reflect a light beam during rotation), or may rotate to different positions and keep stationary at respective positions to reflect light beams. In one example, the rotatable element 19 rotatably reflects the light beams.

The controller 20 communicates with the processor 15 to receive programmed instructions so as to control the rotation of the rotatable element 19. In some examples, the rotatable element 19 may comprise a reflective optics element. The reflective optics element 19 may comprise any suitable optics element, such as a prism that can reflect the modulated light beams onto the object surface 101. In one example, the rotatable element 19 comprises a reflective mirror including a total reflective mirror.

The controller 20 may comprise an electrical and/or mechanical system, such as a mechanism based galvanometer scanner or a resonance scanner to control the rotatable element 19 to reflect the modulated light beams. In non-limiting examples, the rotatable element 19 may be controlled to rotate back and forth by the controller 20 according to the programmed instructions.

As depicted in FIG. 1, the first optics element 21 is disposed between the object 100 and the second optics element 22. The second optics element 22 is disposed between the first optics element 21 and the photodetector 14. The first and second optics element 21, 22 define a view axis (overlapped with the Z-axis 23 for easy illustration) together. Accordingly, after the modulated light beams are diffused by the object surface 101, the diffused light beams near the view axis may be captured and transmitted to the photodetector 14 by the first and second optics 21, 22.

For some arrangements, the first optics element 21 may include an object lens. The second optics element 22 may include a convex lens or a cylindrical lens. The first optics element 21 may be configured to view a small area (point) of the object surface with high spatial resolution in a manner similar to a microscope system. In one example, the first optics element 21 comprises a telecentric lens. In more particular embodiments, the first optics element 21 may be configured to view an area having a linear dimension of a few millimeters in size of the object surface, for example, of less than about 150 microns in size, with a high spatial resolution of less than about ten microns.

Thus, during operation, the light source unit 11 generates the modulated light beams. The rotatable element 19 reflects the modulated light beams from the light source unit 11 onto the object surface 101. Next, the first optics element 21 guides and focuses the light beams from the object surface 101 to the second optics element 22. The second optics element 22 transmits the light beams from the first optic element 21 into the photodetector 14. Finally, the photodetector 14 receives the light beams from the optics unit 13 and outputs electrical signals correlated with the intensities of the diffused light beams to the processor 15 to retrieve the depths or Z coordinate of the point on the object surface 101 along the Z-axis 23.

For some arrangements, the rotatable element 19 may rotate back and forth, so that the modulated light beams from the rotatable element 19 are projected onto the object surface 101 in a scanning mode. As a result, the desired points on the object may be positioned relatively quicker. Much time may be saved to position the desired points on the object surface 1010 and the respective reflected modulated light beams from the rotatable element 19, for example, when the positions of the object vary in a measurement range 'd1' of the measurement system 10 along the Z-axis.

It should be noted that the arrangement in FIG. 1 is merely illustrative. In the illustrated example, the modulator 17, the controller 20 and the processor 15 are provided separately. The modulator 17 and the controller 20 may be communicated with the processor via cables or wireless connection. In some examples, the modulator 17, the controller 20 and the processor 15 may be integrated together.

In other examples, the modulator 17 and/or the controller 20 may not be directly coupled to the processor 15, and instead may control the respective light source 18 and the rotatable element 19 independently. The modulator 17 and the light source 18, and the controller 20 and the rotatable element 19 may be integrated together, respectively. In certain applications, the controller 20 may not be employed and the position of the rotatable element 19 may be adjusted manually. The rotation of the rotatable element 19 may be continuous or discontinuous. The optics unit 13 may comprise one or more optic elements.

In non-limiting examples, the measurement range 'd1' of the measurement system 10 along the Z-axis 23 may be from about zero millimeter to two hundreds millimeters, which indicates the depths or the Z coordinate of the desired points on the object surface may be measured in a range of from about zero millimeter to two hundreds millimeters. As illustrated in FIG. 1, in the measurement range 'd1' of the measurement system 10, the projection positions of the modulated light beams onto the object surface 101 may varies from a near point 'A', such as the zero millimeter point to a distal point 'B', such as the two hundreds millimeters point along the Z-axis 23.

For some arrangements, during operation, directions of the modulated light beams may be substantially perpendicular to a horizontal line, such as the baseline 24 between the photodetector 14 and the rotatable element 19, so that the rotatable element 19 may have a tilt angle α so as to reflect the modulated light beams onto the object surface 101. In certain applications, the baseline 24, the depths or the Z coordinates, and the modulated light beams may form a triangulation, which may be referred to as the triangulation measurement.

For the illustrated arrangement in FIG. 1, a standoff distance 'd2' is about one hundred millimeter from the photodetector to the near point 'A'. A baseline distance 'd3' is also about one hundred millimeter from the photodetector 14 to the rotatable element 19. One modulated light beam 25 projected onto the near point 'A' is taken as an example. A line 26 is the normal line between the modulated light beam 25 and the reflected light beam 27. The normal line 26 is perpendicular to a surface 28 of the rotatable element 19.

An angle β is formed between the normal line 26 and the reflected light beam. An angle θ is formed between the reflected light beam 27 and the base line 24. An angle δ is formed between the modulated light beam 25 and the surface 28 of the rotatable element 19. An angle χ between the modulated light beam 25 and the normal line 26 is equal to the angle β. Thus, correlations of the angles are represented as follows:

$$\alpha+\delta+\theta+\chi+\beta=180°; \chi=\beta; \delta+\beta=90°; \delta+\alpha=90°;$$

Solving the above equations simultaneously yields the equation: β=α. In addition, since the angle β and the angle θ has a relation of 2β+θ=90°, when the modulated light beam 25 is projected onto the near point 'A', since the standoff distance d2 is equal to the baseline distance d3, the angle θ can be represented as follows:

$$\theta = \tan^{-1}\frac{d2}{d3} = \tan^{-1}1 = 45°;$$

Thus, the tilt angle α of the rotatable element 19 can be presented as follows:

$$\alpha=\beta=22.5°$$

Similarly, when the modulated light beam 25 is projected on the distal point 'B', the depths d1 or coordinate Z is about 200 mm, the standoff distance d2 and the baseline distance d3 are about 100 mm. Thus, the angle θ can be represented as follows:

$$\theta = \tan^{-1}\frac{d1+d2}{d3} = \tan^{-1}3 = 71.56°$$

Thus, the tilt angle α of the rotatable element 19 can be presented as follows:

$$\alpha=\beta=9.22°.$$

Accordingly, in one non-limiting example, the tilt angle α of the rotatable element 19 may be varied in a range from about 9.22° to about 22.5° while the rotatable element 19 reflects the modulated light beams from the light source 18 onto the object surface 1010 within the measurement range along the Z-axis 23. In other examples, the measurement range 'd1', the standoff distance 'd2' and/or the baseline distance 'd3' may vary based on different applications. The tilt angle α of the rotatable element 19 may also be varied accordingly.

In embodiments of the invention, the modulator 17 may control the light source 18 to generate a plurality of phase shifted light beams one by one over a short period of time. In certain embodiments, the depths or the Z coordinates of the desired points on the object surface 101 may be accomplished by using any of the traditional algorithms known from phase shift analysis to first combine the information from the phase shifted beams to acquire a phase wrapped profile, and then unwrapping the phase-wrapped profile to retrieve the depths or the Z coordinates of the desired points on the object surface 101 in the processor 15.

In one embodiment, a three-step phase-shifting algorithm is used to determine the depths or the coordinates of the points on the object surface 101. For some arrangements, the modulator 17 may modulate the light source 18 to generate three phase shifted beams separated by 120° degrees (2π/3), that is, the three separate phase shift angles may be −2π/3, 0, and 2π/3. Intensity I(x, y) of each point in the three phase shifted beams can be respectively represented as follows:

$$I_1(x, y)=A+M\cos[\phi(x, y)-2\pi/3]$$

$$I_2(x, y)=A+M\cos[\phi(x, y)]$$

$$I_3(x, y)=A+M\cos[\phi(x, y)+2\pi/3]$$

where A is the average intensity, M is the intensity modulation, and φ(x, y) is the wrapped phase to be determined. Solving the above three equations for φ(x, y) simultaneously yields the following solution:

$$\phi(x, y) = \arctan\left(\frac{\sqrt{3}(I_1 - I_3)}{2I_2 - I_1 - I_3}\right)$$

With the intensity $I_1$, $_2$, and $I_3$ known, the wrapped phase φ(x, y) of each point is determined, and its range is between 0 and 2π. Based on the above equation, the wrapped phases correlated to the respective points on the object surface 101 can be determined. Then, the wrapped phases φ(x, y) of the points are unwrapped in the processor by known phase unwrapping processes to obtain their absolute phases. Then, the actual Z coordinates (x, y) of the points on the object surface 101 may be determined by respective absolute phases and system parameters.

Figure 2:
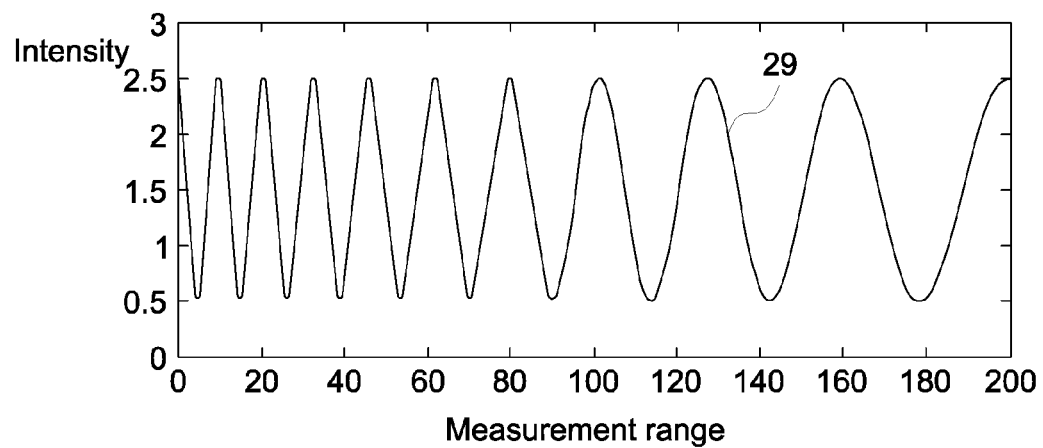
FIG. 2 is a schematic diagram illustrating a profile of a light intensity having more than one period in accordance with one embodiment of the invention.

In some examples, the modulator 17 may modulate the light source 18 to generate the modulated light beams each having a sinusoidal intensity profile. The rotatable element 19 may rotate with a frequency of 'f1'. When the rotatable element 19 rotates at a constant angular speed and one modulated light beam has a frequency of 'F2', which may be N times (N is integer) of the frequency f1 of the rotatable element, N periods of the sinusoidal intensity in the modulated light beam may be formed within the measurement range 'd1' along the Z-axis 23. As illustrated in FIG. 2, a sinusoidal intensity profile 29 having more than one period is formed within the measurement range when N is larger than 1.

For some arrangements, the photodetector 14 may have a certain sensitivity limitation resulting in resolution limitation. In order to increase the depth resolution, the sinusoidal intensity profile having more than one period (or phase cycle) may be formed. However, when the processor 15 unwraps the wrapped phase φ(x, y) to obtain the corresponding absolute phase, due to formation of more than one phase cycle, a phase order ε may be needed to first determined so as to identify a correct phase cycle in the more than one phase cycle for 2π-compensation during unwrapping to obtain the corresponding absolute phase.

Figure 3:
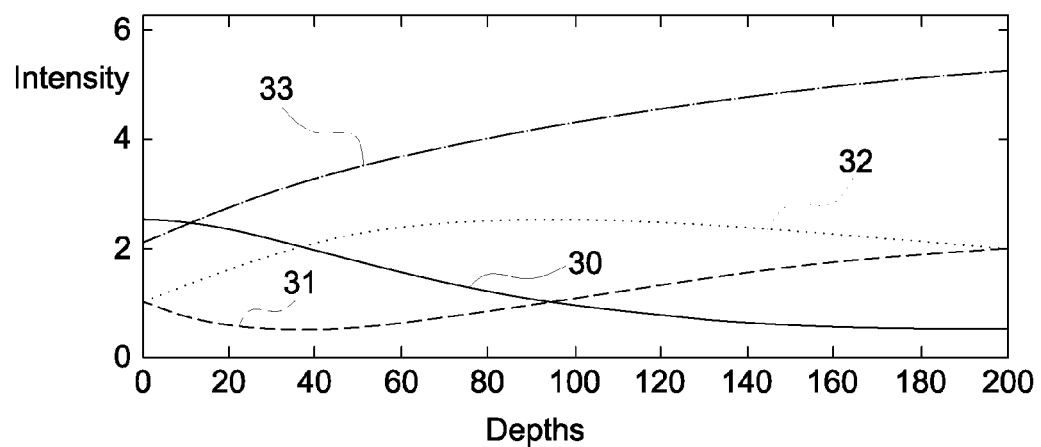
FIGS. 3-4 are schematic diagram illustrating an unwrapping method for determination of an absolute phase based on a wrapped phase.
Figure 4:
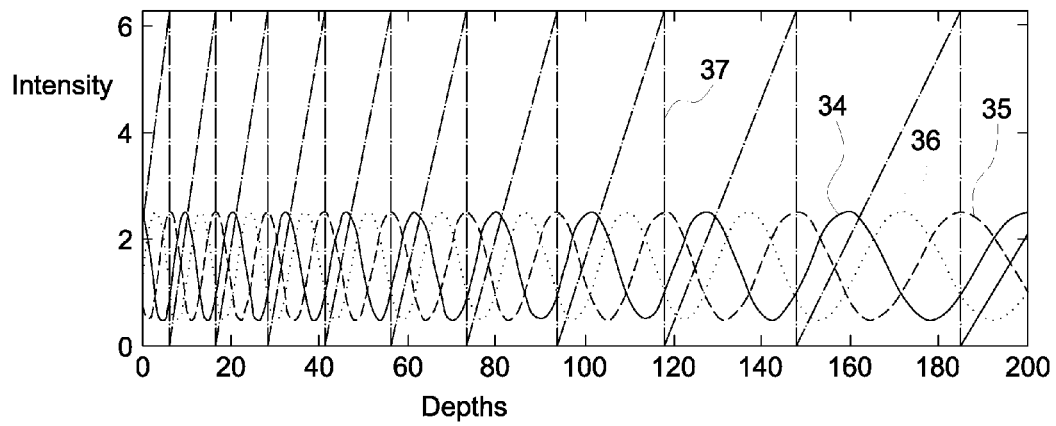

FIGS. 3-4 illustrate an unwrapping method for determining the absolute phase based on the wrapped phase. As illustrated in FIG. 3, firstly, the modulator 17 modulates the light source 18 to generate a first group of three phase shifted light beams, for example, separated by 120° degrees (2π/3) one by one while the rotatable element rotates at a constant angular speed and the frequency of each of the modulated light beams is equal to the frequency of the rotation of the rotatable element 19, which indicate N is equal to 1 and each phase shifted beam comprises one sinusoidal intensity period.

Thus, intensity profiles 30, 31, 32 corresponding to the respective shifted angles of −2π/3, 0, and 2π/3 are determined with each profile having one phase cycle. Then, the processor 15 processes the intensity profiles 30, 31, 32, a wrapped phase profile 33 in a range of from 0 and 2π may be determined, so that a rough depths of the desired point on the object surface and the phase order ε, which is correlated to the rough depths, may be identified for subsequent compensation.

Subsequently, similarly, as illustrated in FIG. 4, a second group of three phase shifted light beams are generated one by one each having more than one period of the sinusoidal intensity and separated, for example, by 120° degrees (2π/3) and processed in the processor 15. Intensity profiles 33, 34, 35 corresponding to the respective shifted angles of −2π/3, 0, and 2π/3 are determined. A wrapped phase profile 37 in a range of from 0 and 2π may also be determined.

Since the phase order ε has been identified, the absolute phase may be represented as ε+p, wherein p is the wrapped phase. As a result, due to the employment of the unwrapping method, the depth resolution of the photodetector 14 may be increased so as to determine the absolute phase correctly for determination of refined depths of the desired point.

Figure 5:
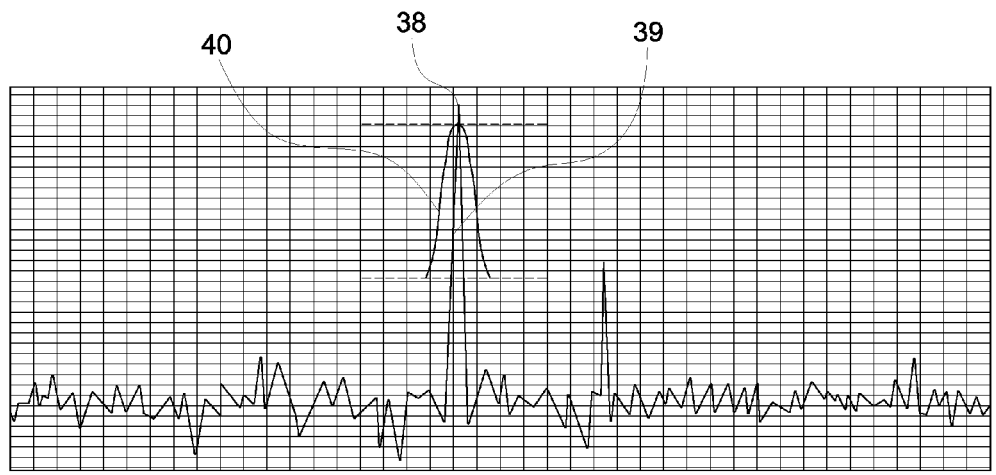
FIG. 5 is a schematic diagram illustrating determination of an intensity value of a light beam diffused from a point on the object.

In certain applications, the photodetector 14 detects signals in the phase shifted light beams with a higher speed than a scanning speed of modulated light beams onto the object surface 101, so that the photodetector 14 may not miss any scanning of the modulated light beams. In some applications, when each of the modulated light beams scans a desired point of the object surface 101 near or intersecting with the view axis, an intensity pulse 38 is generated in the signals detected by the photodetector 14, as shown in FIG. 5.

Then, in the processor 15, a position of a maximum value (not labeled) on the intensity pulse 38 is identified as Vmax. Subsequently, the point values on a section 39 between a position of Vmax/2 and the position of Vmax are collected on the intensity pulse 38. Next, the section 39 of the intensity pulse 38 is fitted into a normal curve 40 using known profile-fitting algorithm such as the least square method. Finally, a peak value on the normal curve 40 is identified as the intensity value correlated with the desired point on the object surface 101. Similarly, the intensity of all of the diffused light beams diffused from the object surface 101 may be determined so as to determine the wrapped phase φ(x, y).

As illustrated in FIG. 1, a distance 'd4' of from a reflective point 'C' on the rotatable element to the distal point 'B' is different from a distance d5 from the reflective point 'C' to the near point 'A'. The distances 'd4', 'd5' and the Z-axis 23 form a triangle together. When the rotatable element 19 rotates with a constant angular speed, the sinusoidal intensity of each modulated light beam may not linearly distribute along the Z-axis 23.

As illustrated in FIGS. 1-2, the periods of the sinusoidal intensity profile 29 becomes wider along the Z-axis 23 with the increase of the distances from the reflective point 'C' to the desired points on the object surface 101. In order to correlate the wrapped phase values and the Z-axis linearly to facilitate determination of the depths of the points on the object surface, the rotatable element 19 may be controlled to rotate in a manner that the rotating angles of each of the modulated light beams with the rotation of the rotatable element 19 has a linear correlation with the time. This may be referred to as a linear correction of the rotatable element 19 and be performed based on experiments or other suitable controlling techniques before the modulated light beams are reflected by the rotatable element 19.

Figure 6:
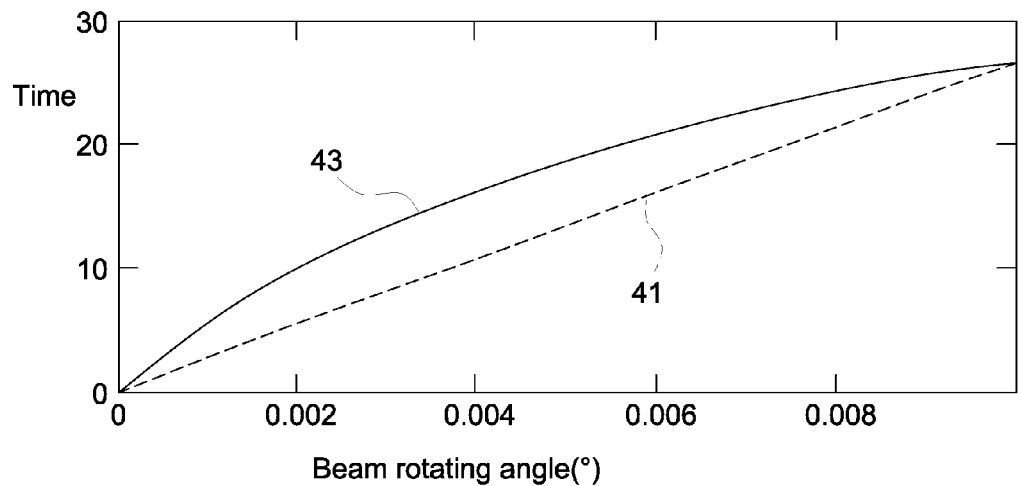
FIG. 6 is a schematic diagram illustrating correlations of rotating angles of a modulated light and the time before and after a linear correction of a rotatable element of the measurement system.
Figure 7:
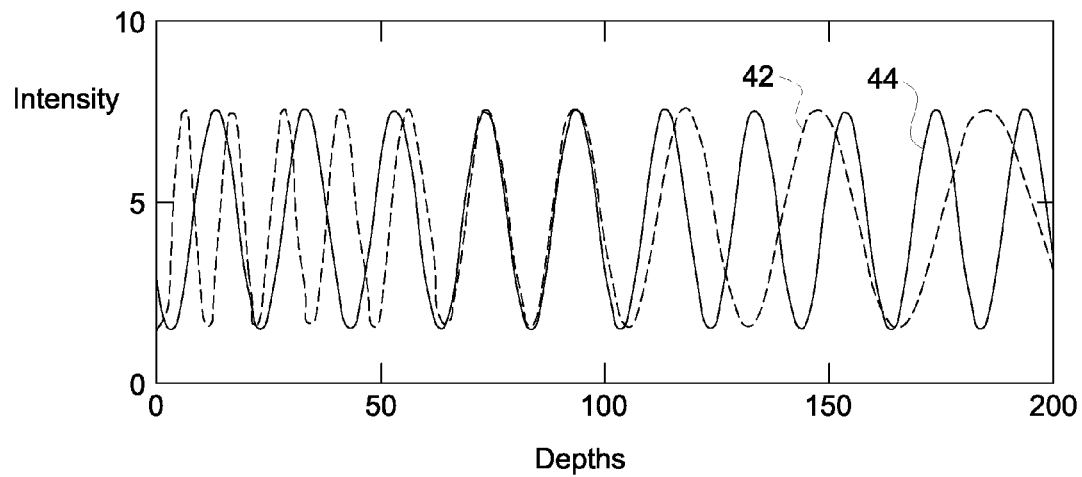
FIG. 7 is a schematic diagram illustrating correlations of a light intensity and depths before and after the linear correction of the rotatable element of the measurement system.

FIG. 6 illustrates correlations of the rotating angles of the modulated light beam and the time before and after the linear correction of the rotatable element 19. FIG. 7 illustrates correlations of the light intensity and the coordinate Z before and after the linear correction of the rotatable element 19. As illustrated in FIGS. 6-7, broken lines 41, 42 illustrate the respective correlations without the linear correction. The solid lines 43, 44 illustrate the respective correlations after the linear correction. According to the comparison of the correlations after and before the linear correction, after the linear correction, the intensity may vary in an sinusoid with similar periods along the measurement range, which is advantageous to determine the correlations of the wrapped phase values and the positions on the Z-axis.

Figure 8:
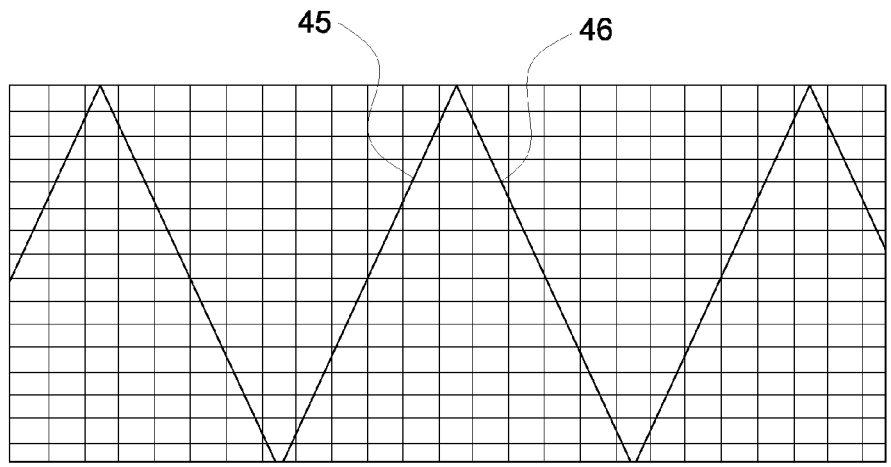
FIG. 8 is a schematic diagram illustrating a wave profile of the rotatable element after modulated by a triangle wave.

In some applications, during the measurement, with the rotation of the rotatable element 19 back and forth, the rotation of rotatable element 19 may be modulated with a triangle wave (not shown) having a plurality rising edges 45 and a plurality of respective falling edges 46 respectively, for example, as illustrated in FIG. 8 before the modulated light beams are reflected by the rotatable element 19 for facilitating detecting of the diffused light beams by the photodetector 14 and processing of the electrical signals in the processor 15. In some examples, the rising edges 45 and the falling edges 46 have a consistent slope, respectively.

Generally, rotating positions of the rotatable element 19 after modulation may be substantially linear to voltage modulations on the controller 20. In non-limiting examples, due to mechanical and/or electrical errors occurred on the projection unit 12, after modulation, the rotating positions of the rotatable element 19 at the rising-edges and the respective falling-edges may not be repeatable.

In certain applications, in order to reduce and/or eliminate the errors caused by the projection unit 12, signals correlated with one of the rising edges 45 or falling edges 46 may be used to determine the depth information embedded in the diffused light beams, which may be accomplished, for example, by multiplying the sinusoidal intensity of the modulated light beam with a square wave (not shown) after the rotatable element 19 is modulated with the triangle wave and before the modulated light beams are reflected by the rotatable element 19. The square wave may have the same frequency as rotation frequency of the rotatable element 19.

Figure 9:
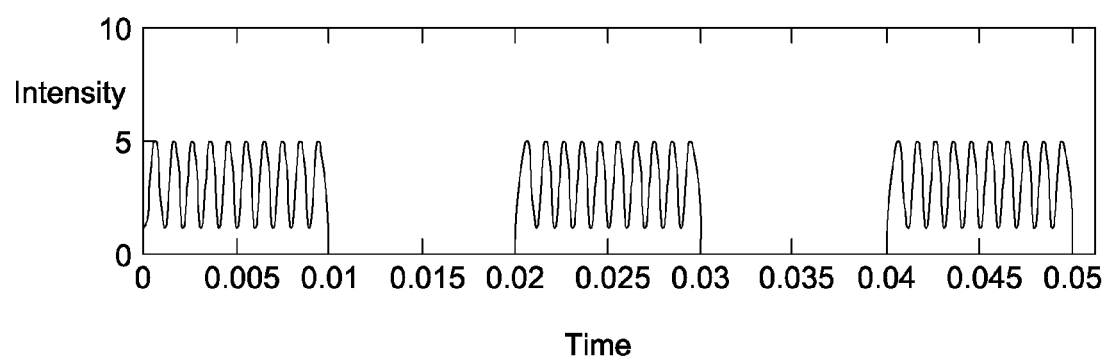
FIG. 9 is a schematic diagram illustrating a sinusoidal intensity profile after modulated with a square wave.
Figure 10:
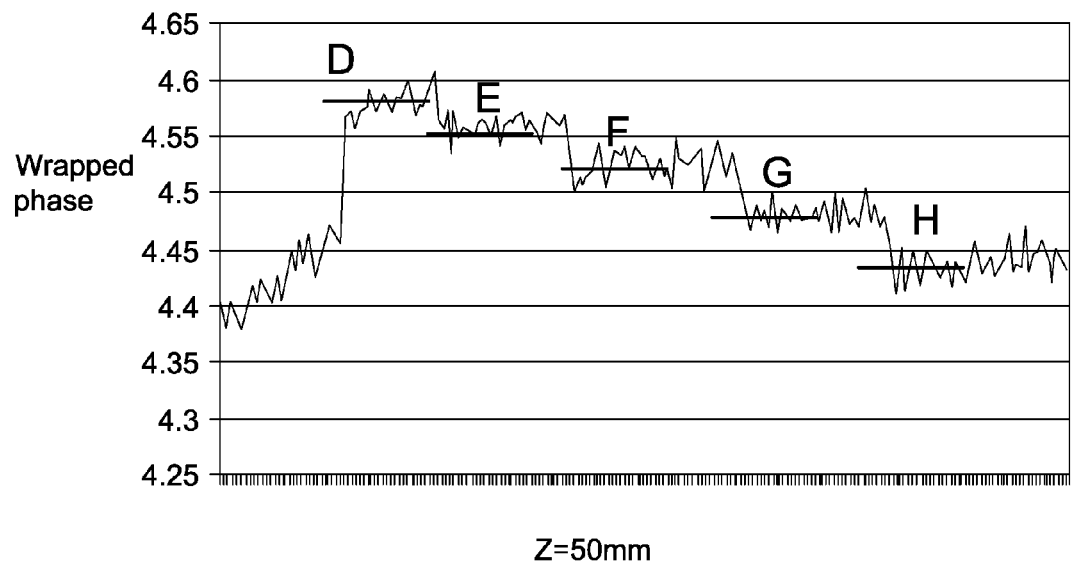
FIGS. 10-13 are schematic diagrams illustrating exemplary measurement experiments of the measurement system shown in FIG. 1 in accordance with various embodiment of the invention.
Figure 11:
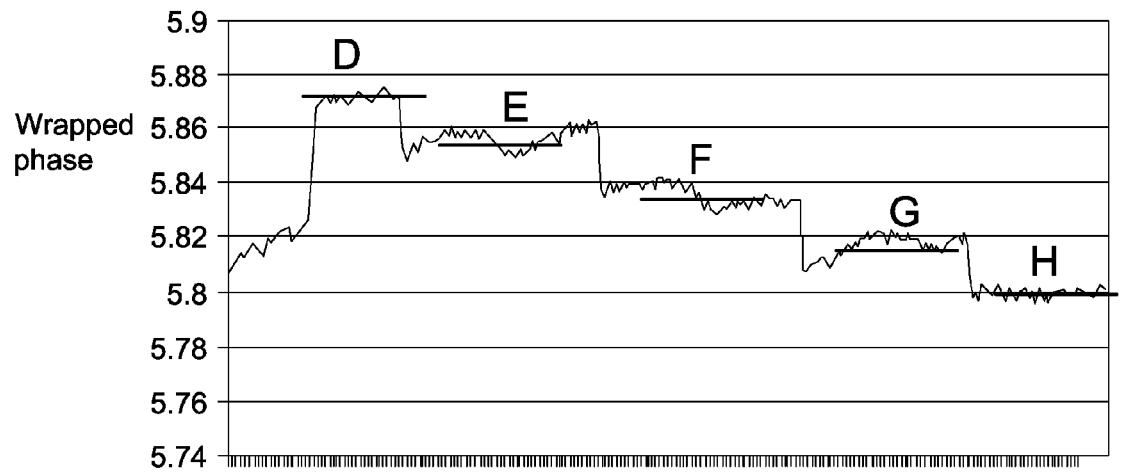
Figure 12:
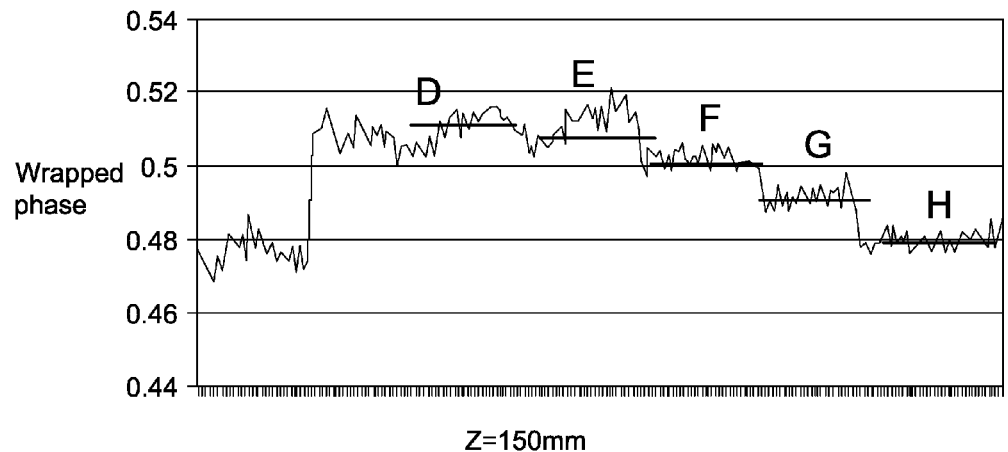
Figure 13:
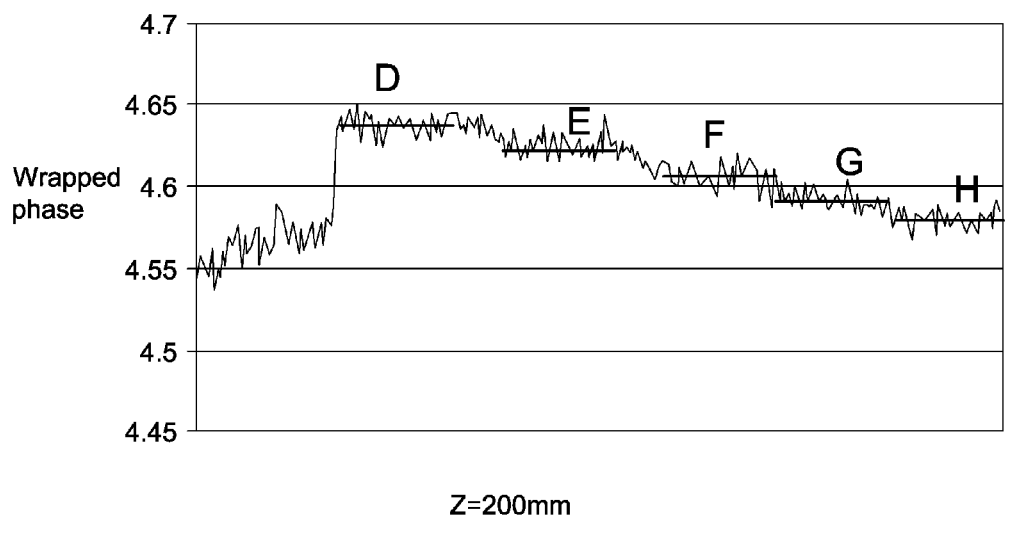

FIG. 9 illustrates a sinusoidal intensity modulated with a square wave. As illustrated in FIG. 9, the rising-edge of the rotatable element 19 modulated with the triangle wave is taken as an example. The amplitude range of the square wave is about from zero to one. Thus, at the rising-edge, the amplitude of the square wave is one, so that the light intensity from the light source may not vary and remain its original values. At the falling-edge, the output of the light intensity is zero, so that the photodetector 14 may capture the diffused light beams at the rising edge and may not capture the intensity information at the falling edge. In certain applications, the intensity profile illustrated in FIG. 9 may be lifted to a certain level so as to reduce the interference of ambient signals to increase the measurement accuracy.

FIGS. 10-13 illustrates exemplary measurement experiments of the measurement system 10 shown in FIG. 1. As illustrated in FIGS. 10-13, the measurements is performed, for example, for 4 times when an object is located at 50 mm, 100 mm, 150 mm, and 200 mm along the Z-axis 23 (shown in FIG. 1), respectively. At each position, the object moves towards the distal point 'B' along the Z-axis 23, for example, 5 times with a movement distance of 10 um each time. Additionally, in each of 5 movements of D, E, F, G and H, a plurality of points (not shown), ten points for example, are selected and the respective wrapped phase values are averaged so as to mitigate noises from the light beams and high frequency signals generated during the measurement.

Accordingly, as depicted in FIGS. 10-13, for the measurements at each position, the changes the wrapped phases are distinguishable during the 5 movements, which indicates good phase sensitivity to the position changes of the object along the Z-axis and the measurement system has a relatively larger measurement range.

In embodiments of the invention, the measurement system employs modulated light beams, the rotatable elements, the photodetector and the processor to provide accurate measurements of the depths or the Z coordinates and a relative larger measurement range. The photodetector captures the diffused light beams with higher resolution. The phase unwrapping method and the profile-fitting algorithm are also employed to mitigate speckles from the object surface and noises from ambient environment, so that the measurement system may be not sensitive to the machined quality of the object surface and increase the measurement precision. In addition, the cost of the components of the measurement system is relatively lower. Since the measurement is non-contact, a lot time can also be saved.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A measurement system, comprising:
   a light source unit configured to generate a plurality of modulated phase shifted light beams;
   a projection unit configured to reflect the modulated phase shifted light beams onto an object surface;
   an optics unit configured to capture the modulated phase shifted light beams from the object surface;
   a photodetector configured to receive the modulated phase shifted light beams from the optics unit to generate electrical signals; and
   a processor configured to retrieve position information of the object surface based on the electrical signals from the photodetector, wherein the position information comprises depths or Z coordinates of a point on the object surface along a Z-axis, wherein after the modulated phase shifted beams from the point on the object are detected by the photodetector, intensity pulses are generated in the respective electrical signals, wherein the processor is further configured to:
   identify positions of maximum values and half maximum valves on the respective intensity pulses,
   collect point values on sections between the maximum value positions and the half maximum value positions on the respective intensity pulses, and
   fit the sections based on the collected point values into respective normal curves, and wherein peak values on the normal curves are intensity values of the respective modulated phase shifted beam.

2. The measurement system of claim 1, wherein the light source unit comprises a light source and a modulator configured to modulate the light source to generate the modulated phase shifted light beams.

3. The measurement system of claim 1, wherein the projection unit comprises a rotatable element configured to reflect the modulated phase shifted light beams onto an object surface.

4. The measurement system of claim 3, wherein the rotatable element is configured to reflect the modulated phase shifted light beams onto an object surface during rotation of the rotatable element.

5. The measurement system of claim 4, wherein a rotating angle of the rotation element is in a range of from 9.22° to 22.5°.

6. The measurement system of claim 1, wherein the optics unit comprises a first optic element and a second optic element disposed between the object and the photodetector.

7. A measurement method, comprising:
   reflecting, a plurality of modulated phase shifted light beams from a light source unit onto an object surface;
   capturing the modulated phase shifted light beams from the object surface via an optics unit;
   detecting the modulated phase shifted light beams from the optics unit to generate electrical signals via a photodetector; and
   processing, the electrical signals from the photodetector via a processor, wherein the electrical signals from the photodetector are processed via the processor to retrieve position information of the object surface; and wherein the position information comprises depths or Z coordinates of a point on the object surface along a Z-axis, wherein after the modulated phase shifted beams from the point on the object are detected by the photodetector, intensity pulses are genenerated in the respective electrical signals, wherein the measurement method further comprising;
   identifying positions of maximum values and half maximum valves on the respective intensity pulses,
   collecting, point values on sections between the maximum value positions and the half maximum value positions on the respective intensity pulses, and
   fitting the sections based on the collected point values into respective normal curves, and wherein peak values on the normal curves are intensity values of the respective modulated phase shifted beam.

8. The measurement method of claim 7, wherein the modulated phase shifted light beams are reflected via a rotatable element.

9. The measurement method of claim 8, wherein a rotating angle of the rotation element is in a range of from 9.22° to 22.5°.

10. The measurement method of claim 8, wherein each of the modulated phase shifted light beams comprises a sinusoidal intensity.

11. The measurement method of claim 10, further comprising modulating rotation of the rotatable element with a triangle wave having a plurality of rising edges and a plurality of respective falling edges before the modulated phase shifted light beams are reflected by the rotatable element.

12. The measurement method of claim 11, wherein the rising edges and the falling edges have a consistent slope, respectively.

13. The measurement method of claim 11, further comprising multiplying the sinusoidal intensity of each modulated light beam with a square wave after the rotatable element is modulated with the triangle wave and before the modulated light beams are reflected by the rotatable element.

14. The measurement method of claim 13, wherein the square wave has the same frequency as a rotation frequency of the rotatable element.

15. The measurement method of claim 10, further comprising performing a linear correction to the rotatable element before the modulated phase shifted light beams are reflected by the rotatable element.

16. The measurement method of claim 10, wherein the light source unit generates a first group of three phase shifted light beams and a second group of three phase shifted light beams after the first group of the three phase shifted light beams are processed via the processor.

17. The measurement method of claim 16, wherein the sinusoidal intensity of each of the phase shifted light beams in the first group comprises one period, and wherein the sinusoidal intensity of each of the phase shifted light beams in the second group comprises more than one period.

18. The measurement of claim 17, wherein the processor processes the first group of the three phase shifted light beams to obtain a rough position information and a phase order of the point on the object surface, and wherein the processor processes the second group of the three phase shifted light beams to obtain a refined position information of the point on the object surface based on the phase order.

* * * * *